Dec. 18, 1962

H. D. BISHOP 3,069,043

FOOD PACKAGE

Filed Sept. 23, 1959

INVENTOR.
Henry David Bishop
BY

ATTORNEY

United States Patent Office 3,069,043
Patented Dec. 18, 1962

3,069,043
FOOD PACKAGE
Henry David Bishop, Mount Clemens, Mich., assignor to Aluminum Company of America, Pittsburgh, Pa., a corporation of Pennsylvania
Filed Sept. 23, 1959, Ser. No. 841,895
1 Claim. (Cl. 220—13)

This invention relates to packages, and has for its object to provide a package for holding food which may be heated, in preparation for serving, while in said package, and served from said package while maintained in a warm condition.

It is another object of the invention to provide a food package of the above type formed from disposable, inexpensive light metal such as aluminum foil.

These together with other objects and advantages of of the invention will best be understood by referring to the following detailed specification and preferred embodiment thereof, and to the accompanying drawings, in which.

In general, my improved food package incorporates two containers in substantially concentric arrangement similar to that of a double boiler. The containers may be of any desired shape, but preferably are constructed as shallow pans of circular cross-section. The outer container is for holding water and is subject directly to the heat of an electric or gas range. The smaller container for holding food is supportingly engaged within said outer container by suitable support means and terminates above the bottom of said outer container in such a manner as to define a compartment for the boiling liquid. The lower portion of the food container is thus surrounded by water and exposed to the heat of the boiling water.

Figure 1:
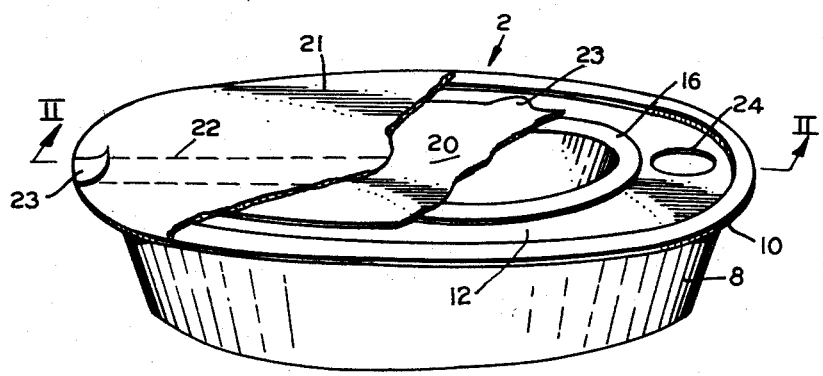
FIG. 1 is a perspective view of a food package embodying my invention. Portions of the covers have been broken away to show otherwise hidden structural features.
Figure 2:
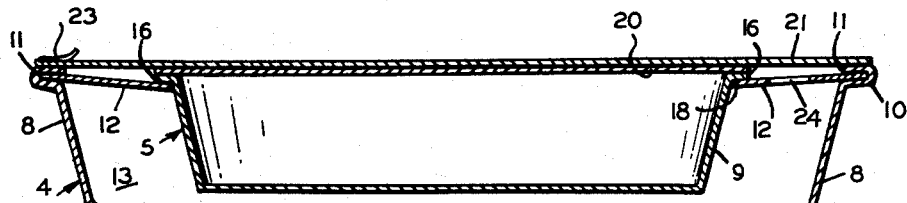
FIG. 2 is a vertical sectional view on line II—II of FIG. 1.

Referring to the drawings wherein like reference numerals designate similar parts throughout the various views, 2 designates generally a food package formed from thin light metal, preferably aluminium foil. The outer container 4, preferably of circular cross-section, has a substantially flat bottom wall 6 and upwardly extending side wall 8 terminating at its marginal edge with an outwardly directed annular flange 10 having an inwardly turned reverse bend forming recess 11, as shown in FIG. 2.

Food container 5, of similar structure but of smaller diameter and less depth than outer container 4, is mounted within said outer container, the substantially concentric arrangement thus defining a compartment 13 for the boiling water. The side wall 9 of food container 5 is bent outwardly to provide annular laterally projecting flange 16 having horizontally disposed extending rim 12, preferably formed as a disc-like collar, for supportingly engaging said food container 5. Extending rim or collar 12 is provided with a centrally disposed opening 18 adapted to receive the food container. The periphery of the extending rim or collar is of such contour as to seat upon annular flange 10 and within recess 11 and the extending rim conjoined at its marginal edge between the walls of the recess by crimping, welding or the like. The food container 5 is inserted through opening 18 and is supported snugly in place by reason of the annular flange 16 resting upon the top side of the collar 12 adjacent the opening.

The food in container 5 is protected by an imperforate cover or closure 20 which may be formed from inexpensive material such as metal foil or cardboard. The cover may be provided with a circular cutout portion (not shown) and a plastic inserted so that the food in the container may be visually observed. Where desired, the package may be provided with a further outer cover 21 attached to the rim of the outer container and extending over the inner container (FIGURES 2 and 3).

In practicing the invention, the covers 20 and 21 are removed by means of pull tabs 22 and tear strip 23 perforated to facilitate opening. Water is introduced into the outer container through hole 24 in plate 12 intermediate the outer container 4 and food container 5, and the water brought to a boil by means of an electric or gas range. The food may be served directly from the package, thereby maintaining the food in a warm condition which may be particularly desirable in serving infants. The hole 24 may be provided with a suitable closure (not shown) to prevent the escape of hot water and steam which may be desirable during serving.

Figure 3:
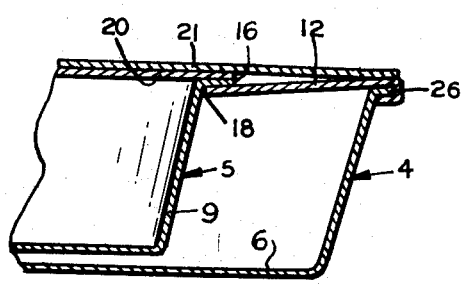
FIG. 3 is a fragmentary vertical sectional view similar to the right side of FIG. 2, showing a modified construction.

There is illustrated in FIG. 3 an alternate securing means for attaching the said support 12 to the package. Outer container 4 is provided with annular projecting rim or lip 26. The periphery of said supporting rim or collar 12 is then folded over rim 26 in such a manner as to encompass the rim as shown in the figure.

Figure 4:
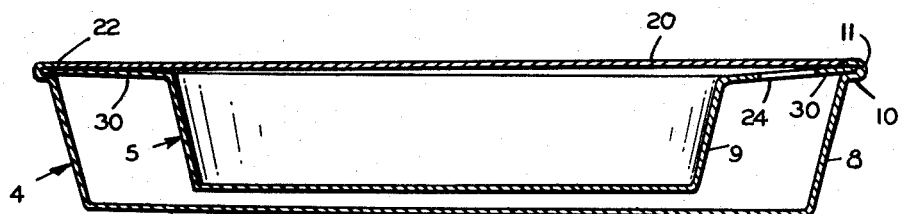
FIG. 4 is a view similar to FIG. 2 modified to illustrate substitute support means.

FIG. 4 illustrates a modified support means of the invention in which the side wall 9 of food container 5 is bent outwardly at its marginal edge to form annular laterally projecting flange 30. The food container 5 is supported within outer container 4 by seating the outer periphery of said flange 30 on annular flange 10 and within recess 11, and conjoining the said periphery between the walls of recess 11, substantially as described above.

Having described the invention generally and in terms of specific embodiments thereof, I claim:

In a food container comprising a non-combustible outer container having a marginal rim, a smaller inner container disposed within said outer container and spaced therefrom, said inner container having an annular flange fixedly attached thereto and projecting laterally therefrom, a cover for said inner container, and a cover for said outer container extending over said inner container, the improvement comprising the said marginal rim of the outer container being turned outwardly and then reversely turned inwardly providing a substantially flat uppermost surface in overlapping relation to the outwardly turned portion of the marginal rim to form a recess, the said flange having its outer rim seated in the said recess and fixedly joined to the said outer container between the walls of said recess, and said cover for said outer container being fixedly attached to the substantially flat uppermost surface of said inwardly turned marginal rim of said outer container and being free of engagement with the rest of the marginal rim.

References Cited in the file of this patent
UNITED STATES PATENTS

| | | |
|---|---|---|
| 120,995 | O'Sullivan | Nov. 14, 1871 |
| 877,675 | Smothers | Jan. 28, 1908 |
| 1,003,112 | Johnson | Sept. 12, 1911 |
| 1,485,602 | Fleischer | Mar. 4, 1924 |
| 1,648,725 | Endicott | Nov. 8, 1927 |
| 2,545,733 | Hatfield | Mar. 20, 1951 |
| 2,591,578 | McNealy et al. | Apr. 1, 1952 |
| 2,683,974 | Brown | July 20, 1954 |
| 2,771,754 | Winkler | Nov. 27, 1956 |
| 2,775,383 | Kolman et al. | Dec. 25, 1956 |
| 2,777,601 | Cheeley | Jan. 15, 1957 |
| 2,850,391 | Gunsberg | Sept. 2, 1958 |